(12) United States Patent
Pfetzer

(10) Patent No.: US 6,657,347 B2
(45) Date of Patent: Dec. 2, 2003

(54) ROTOR

(75) Inventor: Johannes Pfetzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,736

(22) PCT Filed: Mar. 30, 2001

(86) PCT No.: PCT/DE01/01269
§ 371 (c)(1),
(2), (4) Date: Mar. 26, 2002

(87) PCT Pub. No.: WO01/76040
PCT Pub. Date: Oct. 11, 2001

(65) Prior Publication Data
US 2002/0105243 A1 Aug. 8, 2002

(30) Foreign Application Priority Data

Apr. 4, 2000 (DE) .......................... 100 16 643
Oct. 17, 2000 (DE) .......................... 100 51 308

(51) Int. Cl.$^7$ ............................................. H02K 21/12
(52) U.S. Cl. ............................ 310/156.08; 310/156.01; 310/156.12
(58) Field of Search ..................... 310/156.08, 156.12, 310/156.01, 156.13, 156.14, 156.64, 156.68, 156.23, 156.03

(56) References Cited

U.S. PATENT DOCUMENTS

| 4,472,650 A | * | 9/1984 | Advolotkin et al. ........ 310/156 |
| 5,596,238 A | * | 1/1997 | Milnikel ..................... 310/103 |

FOREIGN PATENT DOCUMENTS

| FR | 002779584 A1 | * | 6/1998 | ............ H02K/1/27 |
| JP | 409019091 A | * | 1/1997 | ............ K02K/1/27 |

* cited by examiner

Primary Examiner—Thanh Lam
(74) Attorney, Agent, or Firm—Ronald E. Greigg

(57) ABSTRACT

A rotor according to the prior art has a top part and a bottom part, where the bottom part has stays that are mechanically connected to the top part. However, this has the disadvantage that very strict tolerances must be respected and the type of fastening is not secure. A rotor according to the invention has a ring, which presses stays and thus, by means of positive and frictional engagement, magnets against a tubular element, which in turn is disposed on a bottom part. The bottom part, together with a rotor shaft and a top part, constitutes a rotor.

35 Claims, 16 Drawing Sheets

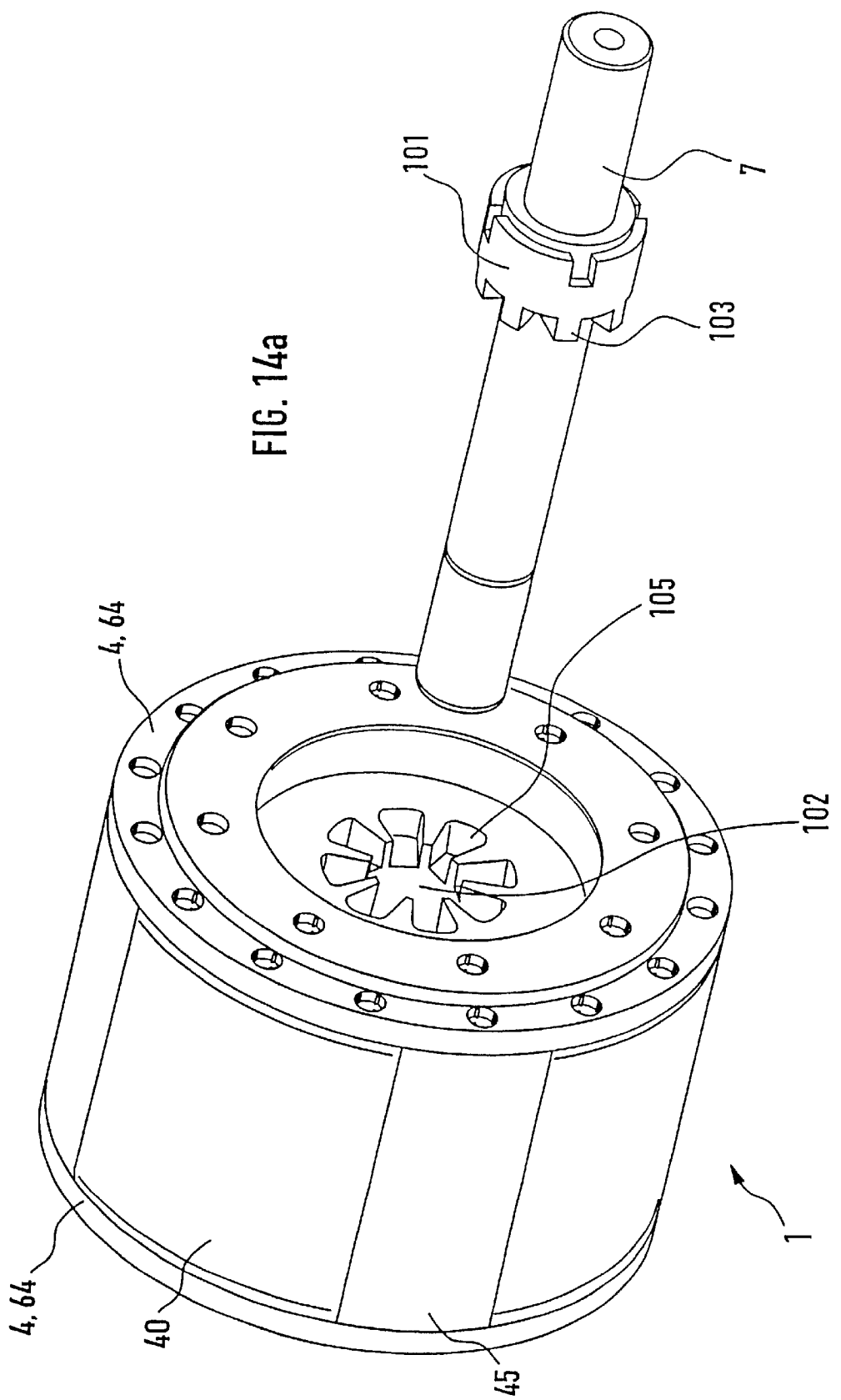

ROTOR

CROSS-REFERENCE TO RELATED APPLICATIONS

This application is a 35 U.S.C. 371 application of PCT/DE 01/01269, filed on Mar. 30, 2001.

BACKGROUND OF THE INVENTION

1. Field of the Invention

The invention is based on a rotor including a magnet holder having top and bottom parts joined by stays.

2. Description of the Prior Art

A rotor with a magnet holder is already known from U.S. Pat. No. 4,591,749. The magnet securing apparatus is comprised of a top part, a bottom part, and stays. The top part and bottom part are connected to each other through mechanical deformation of the stays. This type of connection, however, is not very operationally reliable and very strict tolerances must be maintained for the assembly of the rotor.

SUMMARY OF THE INVENTION

The rotor according to the invention has the advantage over the prior art that a rotor is assembled in a simple manner.

In order achieve an advantageous securing of magnets to the rotor by means of stays, it is useful for the stays to constitute a positive engagement with the magnets because as a result, forces during operation of the rotor are distributed over a greater area.

It is advantageous for each stay to have an axial tab that is engaged by a ring because this allows the ring to not protrude past a circumferential surface of the stay and magnet.

It is advantageous to embody a top part of the rotor as disk-shaped because this makes the top part easy to produce.

It is also advantageous to fasten a bottom part to a rotor shaft.

It is particularly advantageous that the stays and magnets rest against a tubular element because then the ring presses the stays and magnets against the tubular element.

To secure the stays to the tubular element, it is advantageous for at least one of the stays to have a pin, which engages in a recess in the surface of the tubular element.

The assembly of the tubular element and bottom part can take place in an advantageous manner because the tubular element has a radial collar, which is oriented toward the central axis and can be inserted into a corresponding groove on the bottom part. As a result, the tubular element is also secured to the bottom.

In order to compensate for a tolerance between the tubular element and the bottom part, it is advantageous for the bottom part to have a radially protruding spring rib.

The bottom part and top part can easily be held together by a detent connection.

In order to reduce the number of parts to be assembled, it is advantageous to embody the stays as being of one piece with the bottom part or a top part.

If the tubular element is a tubular ring, the number of parts to be assembled is advantageously reduced and the assembly is simplified.

In order to compensate for an imbalance of the rotor, it is advantageous for the bottom part to have bores into which balancing weights can be inserted.

If a ring is embodied as a spring ring, the stays can be advantageously pressed against the tubular element and the rotor can be simply and rapidly manufactured.

If a rotor shaft has a driver, the torque can be advantageously transmitted from the rotor to the rotor shaft.

It is also advantageous if the stay has a securing piece, which extends through an opening of the tubular element, because this axially secures the stay.

By means of a bayonet connection between the ring and the securing piece, the stay is advantageously pressed against the magnets and the tubular element and is thus secured radially.

BRIEF DESCRIPTION OF THE DRAWINGS

Two exemplary embodiments of the invention are shown in simplified fashion in the drawings and are explained in detail herein below, in conjunction with the drawings, in which:

FIG. 14*a* shows a completed rotor, without a mounted rotor shaft

DESCRIPTION OF THE PREFERRED EMBODIMENTS

Figure 1:
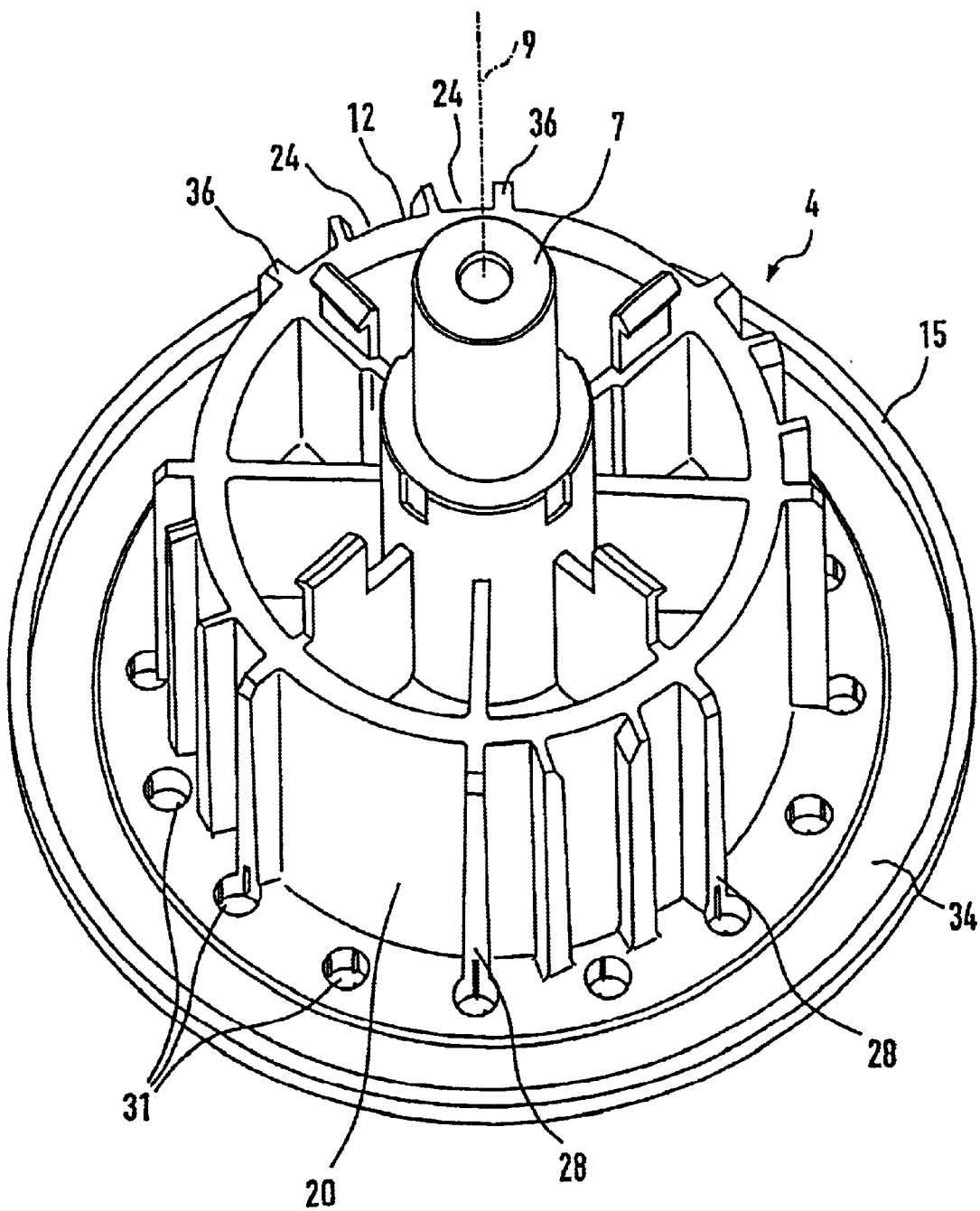
FIG. 1 shows a bottom part, which is part of a rotor according to the invention, with a rotor shaft.

FIG. 1 shows a bottom part 4 of a rotor 1 (FIG. 5) with a rotor shaft 7. The rotor shaft 7 is inserted into the bottom part 4 and fastened in it, and has a central axis 9, which also constitutes, for example, a symmetry axis for the bottom part 4 or the rotor 1. The stepped bottom part 4 has a cylindrical part 12 and a radial collar 15 adjoins its one axial end. For example, the bottom part 4 is made of plastic or metal.

An outer surface 20 of the cylindrical part 12 is provided with at least one groove 24 that extends parallel to the central axis 9. In this exemplary embodiment, there are four grooves 24.

In addition, the outer surface 20 is provided with at least one rib 36 that extends parallel to the central axis 9.

Figure 4:
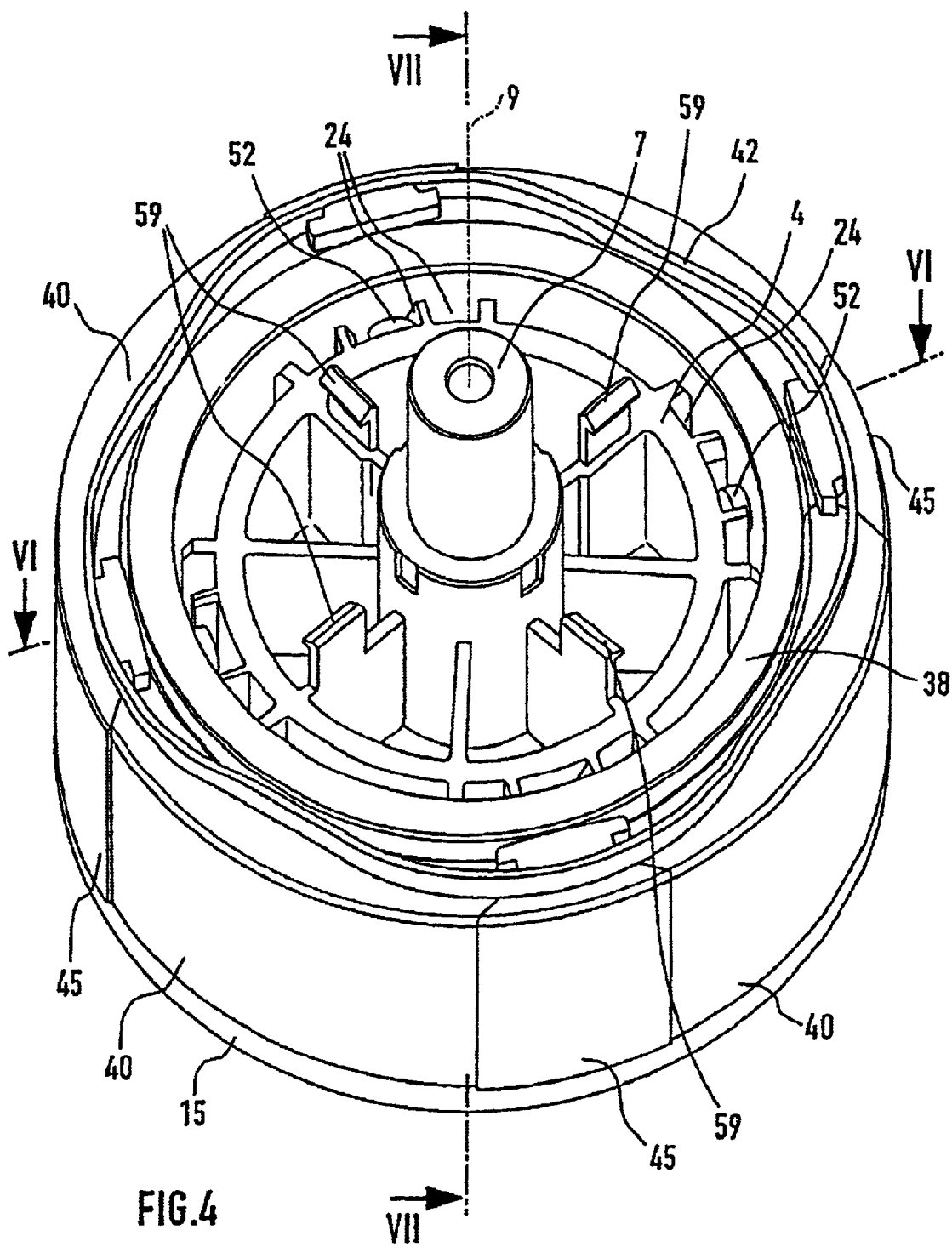
FIG. 4 shows a bottom part with a mounted tubular element, stays, magnets, and a ring.

The cylindrical part 12 has at least one spring rib 28 that can be elastically or elastically/plastically deformed, which is used for tolerance compensation with a tubular element 38 that is to be mounted onto it (FIG. 4). The spring rib 28 can be provided on the outer surface 20, on the rib 36, or on one of the rails constituting the groove 24.

The radial collar 15 has bores 31 into which balancing weights can be inserted so that the rotor can be balanced for installation in an electric motor. Oriented toward the cylindrical part 12, the radial collar 15 has an at least partially continuous circumferential groove 34, which produces a positive engagement with the components mounted onto the cylindrical part 12.

Figure 2:
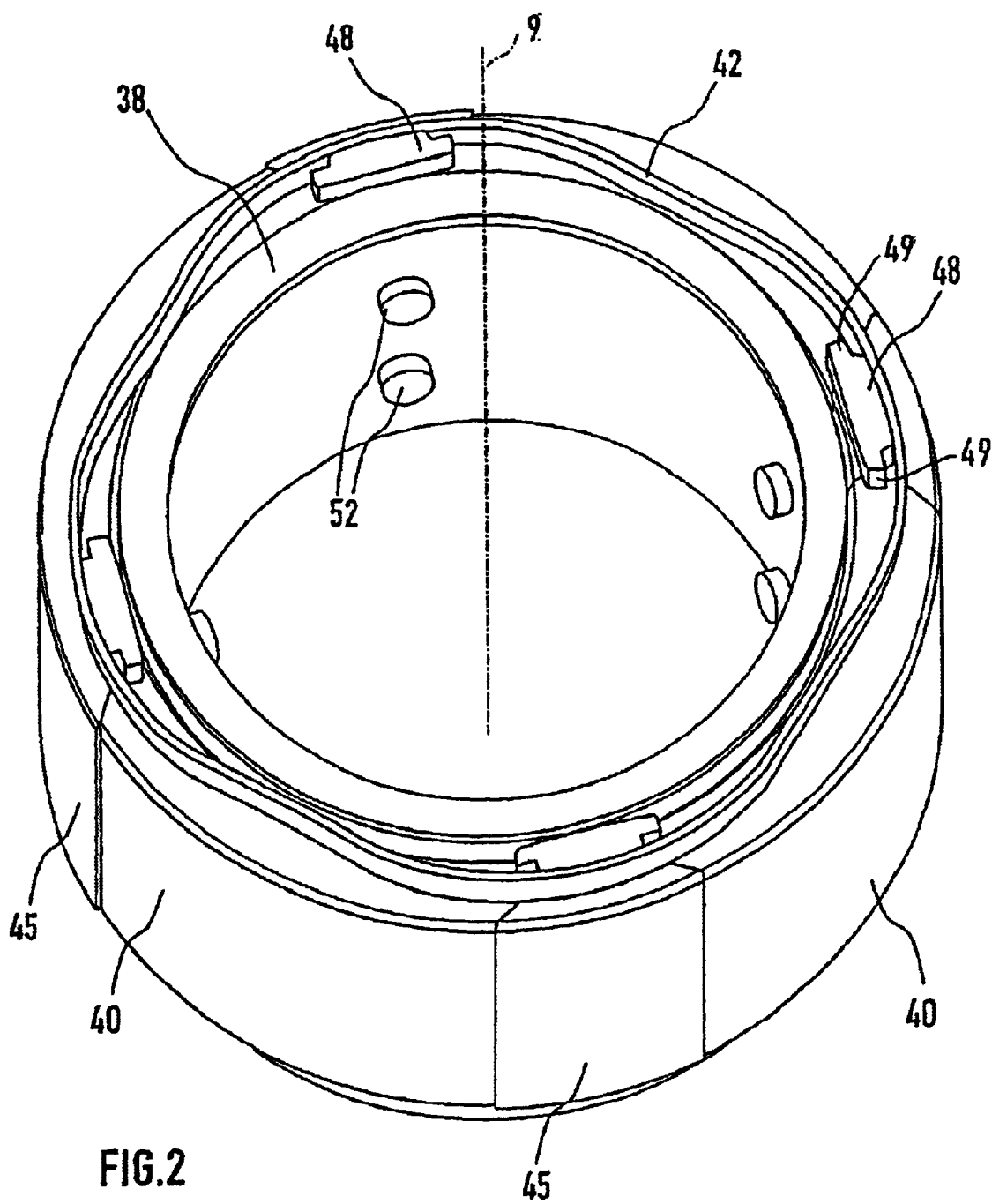
FIG. 2 shows a tubular element with mounted stays, magnets, and a ring.

FIG. 2 shows a tubular element 38 that has at least one magnet 40 disposed on it, which is coupled by means of at least one stay 45. In this exemplary embodiment, there are four magnets 40 and four stays 45, which are arranged in alternation on the tubular element 38, and at least one of the stays 45 does not touch the tubular element 38. On their side surfaces extending in the direction of the central axis 9, the magnets 40 and stays 45 have contours, e.g. in the form of a dovetail, so that these side surfaces of the magnets 40 and stays 45 engage one another with positive engagement. The tubular element 38 can also be comprised of a number of parts.

The stay 45 has at least one axial tab 48 protruding axially beyond the magnets 40, which is embodied, for example, in the shape of a collar oriented toward the tubular element 38 and is engaged by a ring 42. The tab 48 can, for example, be embodied at both axial ends of the stay 45.

The ring 42 is thus disposed in front of the end surfaces of the magnets 40 and does not protrude beyond an outer circumference of the attached stays 45 or magnets 40. The ring 42 secures the magnets 40 by means of constant pressure against the tubular element 38 by exerting a radial force on the stays 45, which the stays 45 transmit to the magnets 40.

For example, the magnets 40 are embodied in the form of arc segments and fit the shape of the tubular element 38.

The magnets 40 and stays 45 constitute a positive engagement so that the forces during operation of the rotor 1 are distributed uniformly over contact surfaces of the magnets 40 and stays 45.

For example, the tab 48 has at least one projection 49, which protrudes beyond an end surface of the magnet 40 and thus secures the magnet 40 axially. For example, the tab 48 in FIG. 2 has two projections 49. The tab 48, which is provided for example on the opposite end of the stay 45, can be embodied in a similar fashion.

The tubular element 38 is advantageously embodied as a tubular ring and has at least one protrusion 52 oriented toward the central axis 9.

For example, the tubular element 38 is made of plastic or metal. If the tubular element 38 is magnetically conductive, it serves as a retaining element.

Figure 3:
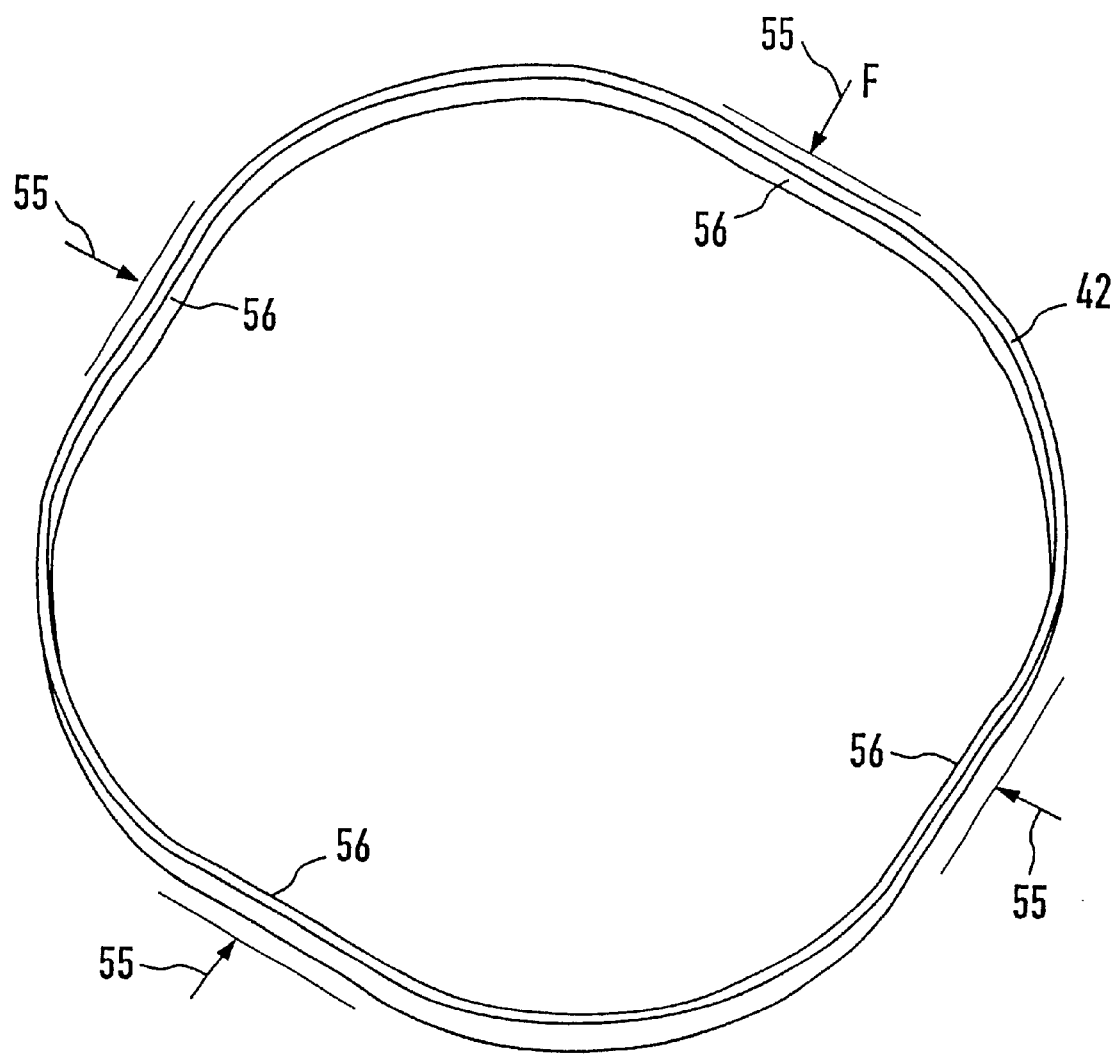
FIG. 3 shows a ring.

FIG. 3 shows the ring 42. For example, the ring 42 is a spring ring 42 and when not deformed, is embodied as circular, for example (not shown).

An inner diameter of the ring 42 is greater than an outer diameter of the tubular element 38 and less than a diameter of an imaginary circular circumference line, which is determined by an outer surface of the axial tabs 48.

Through forces, indicated by the arrows 55, being exerted at for example four points 56 of the ring 42, which are distributed for example evenly around an outer diameter, the ring 42 is deformed by means of an installation grasping tool so that the ring 42 can be slid over the axial tabs 48 of the stays 45. Between the points 56, the ring 42 bulges out and thus fits over the axial tabs 48. When the exertion of the forces is released, the spring ring 42 attempts to return to its original shape and thus exerts a force, which engages the stays 45 in the direction of the central axis 9.

For example, two rings 42 are provided, which are attached to the two axial ends of the rotor.

If the stays 45 are embodied of one piece with the top part (64) or the bottom part (4), then one ring 42 is provided.

The ring 42 can also be embodied as a rigid ring 42, which is then pressed over the axial tabs 48 of the stays 45.

FIG. 4 shows the individual parts shown in FIGS. 1 and 2 when they are assembled. That is, the bottom part 4 with the rotor shaft 7 is slid into the tubular element 38, which is provided, according to FIG. 2, with magnets 40, stays 45, and spring rings 42. The radial protrusions 52 of the tubular element 38 are slid into the groove 24 of the bottom part 4. These protrusions 52 transmit the torque of the magnets 40, which is produced in an external excitation field of a stator of an electric motor, to the bottom part 4 and therefore to the rotor shaft 7.

The components according to FIG. 2 rest with the end surface of the tubular element 38 in the circumferential groove 34. The tubular element 38 engages positively with the bottom part 4 by means of the deformable spring ribs 28. When assembled, the circumferential groove 34 and the collars 15 cover the region of the non-round ring 42 and the tabs 48 of the stays 45 and thus, by forming a smooth surface, prevent blade losses of the rotor 1 when the rotor rotates in a fluid. At the same time, the rings 42 are secured axially. For example, the bottom part 4 has four hooks 59, which are part of a detent connection with a top part 64 (FIG. 5).

Figure 5:
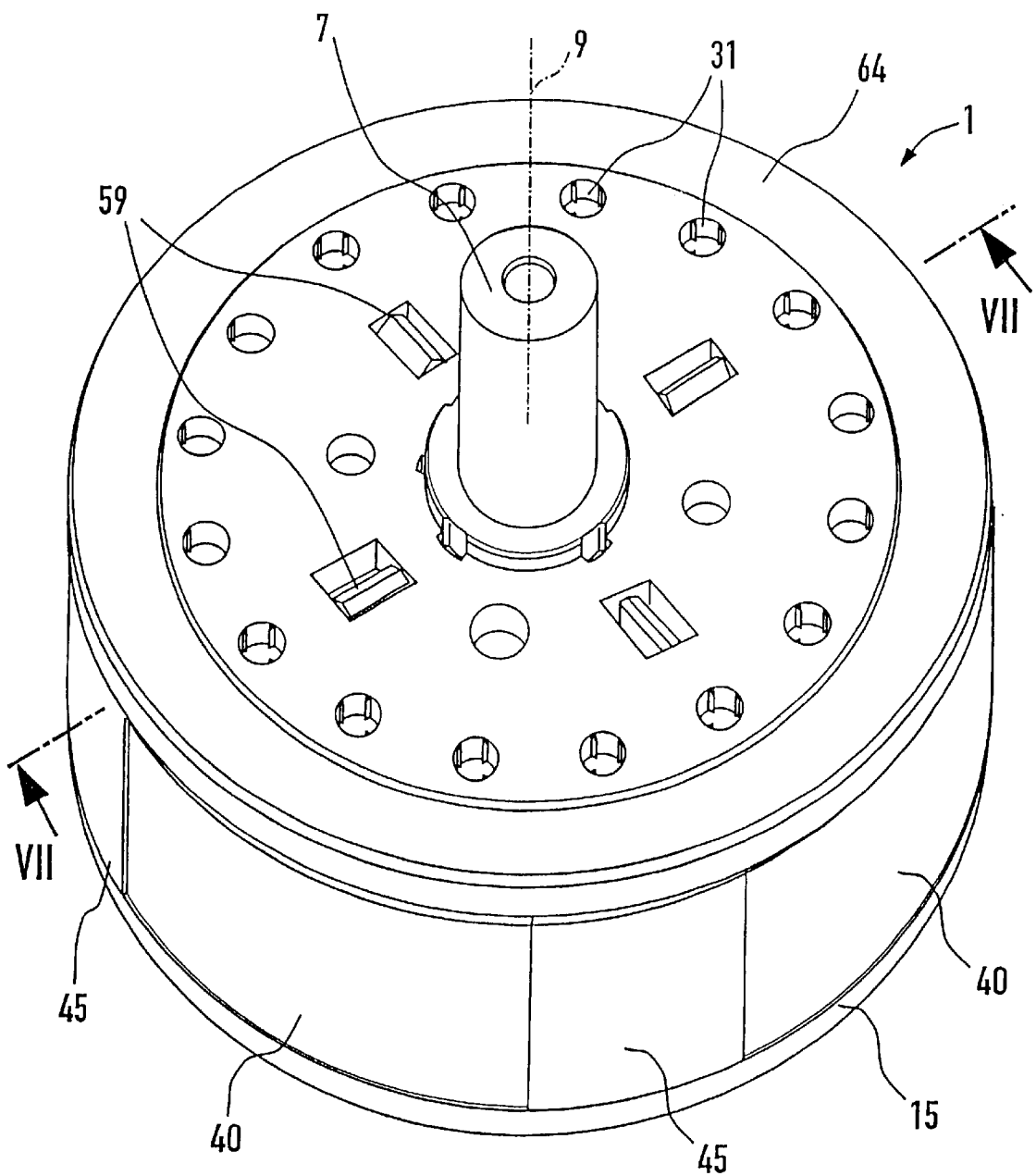
FIG. 5 shows a rotor according to the invention when assembled.

FIG. 5 shows a rotor 1 according to the invention when assembled with the top part 64.

For example, the top part 64 is embodied in the shape of a disk and has appropriate openings for the hooks 59 of the bottom part 4 to engage in so that a detent connection is produced by means of which the top part 64 fixes the tubular element 38 to the bottom part 4, along with the magnets 40, stays 45, and spring rings 42.

For example, the top part 64 also has bores 31, into which balancing weights can be inserted.

Like the collar 15 of the bottom part 4, the top part 64 has a corresponding circumferential groove 34 with the same purpose of covering the other ends of the tubular element 38, magnets 40, stays 45, and the spring ring 42.

Figure 6:
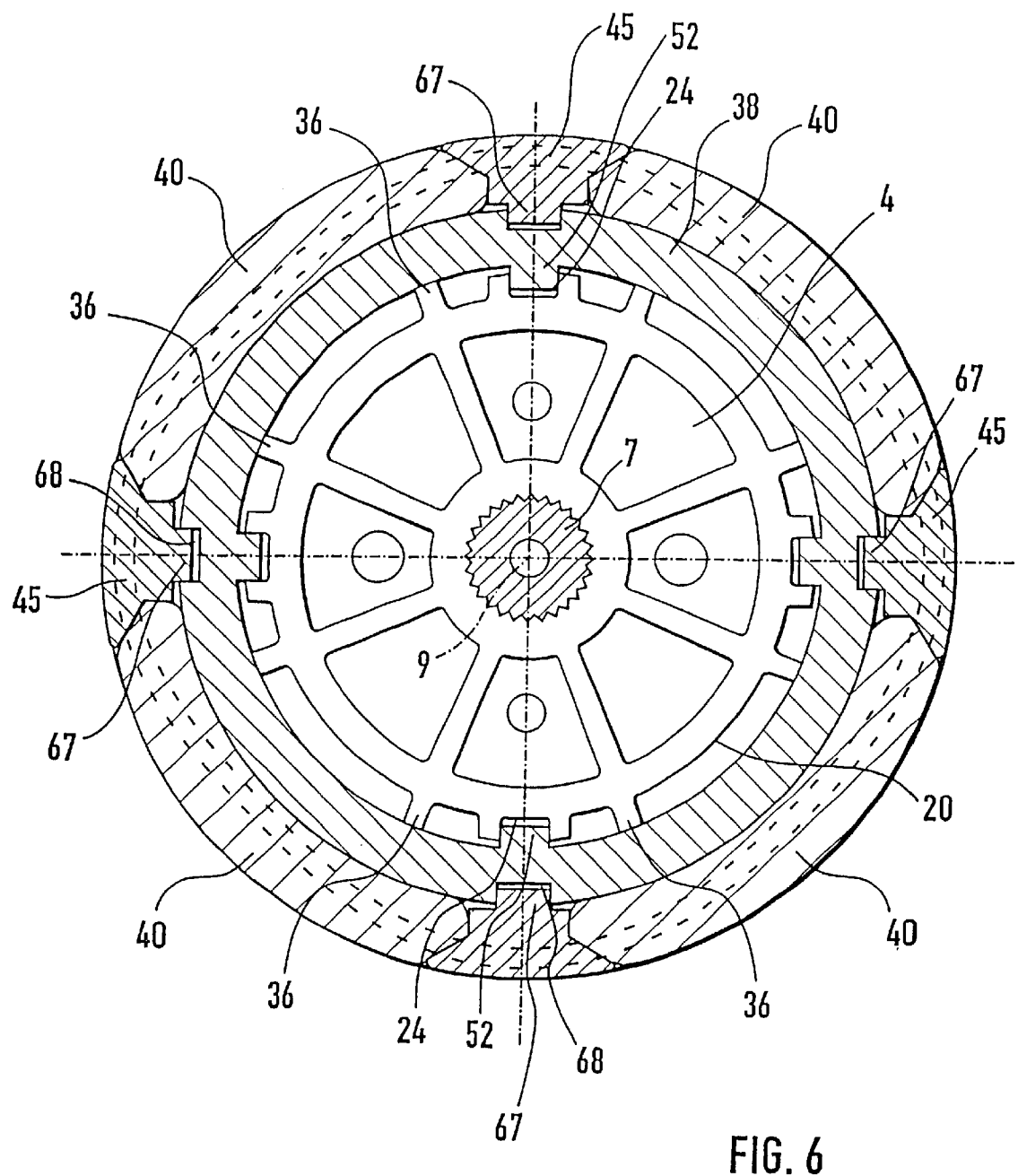
FIG. 6 shows a radial cross section along the line VI—VI in FIG. 4.

FIG. 6 shows a radial cross section along the line VI—VI in FIG. 4.

FIG. 6 shows the cross section of the stays 45, which is, for example, the same over the entire length. The stays 45 form a positive engagement with the magnets 40 and produce, for example, a circular circumference line. In addition, at least one of the stays 45 has at least one pin 67, which engages in a corresponding recess 68 of the tubular element 38 and thus secures the stay in its position. These pins 67 simultaneously serve to position the magnets 40 on the tubular element 38. In the production of the recess 68 for the pins 67, the radial protrusions 52 of the tubular element 38 can be produced, for example by means of stamping, in that the material of the recess 68 is pressed out toward the central axis 9.

The protrusion 52 of the tubular element 38 engages in the groove 24, but does not necessarily rest with its end surface against the outer surface 20 of the bottom part 4. At least a part of a side surface of the protrusion 52 rests snugly against the groove 24 so that here, too, as with the pin 67, a torque can be directly transmitted.

The tubular element 38 rests against the ribs 36.

Tolerance-induced differences between the inner diameter of the tubular element 38 and the radial span of the ribs 36 are compensated for by the deformation of the at least one spring rib 28.

Figure 7:
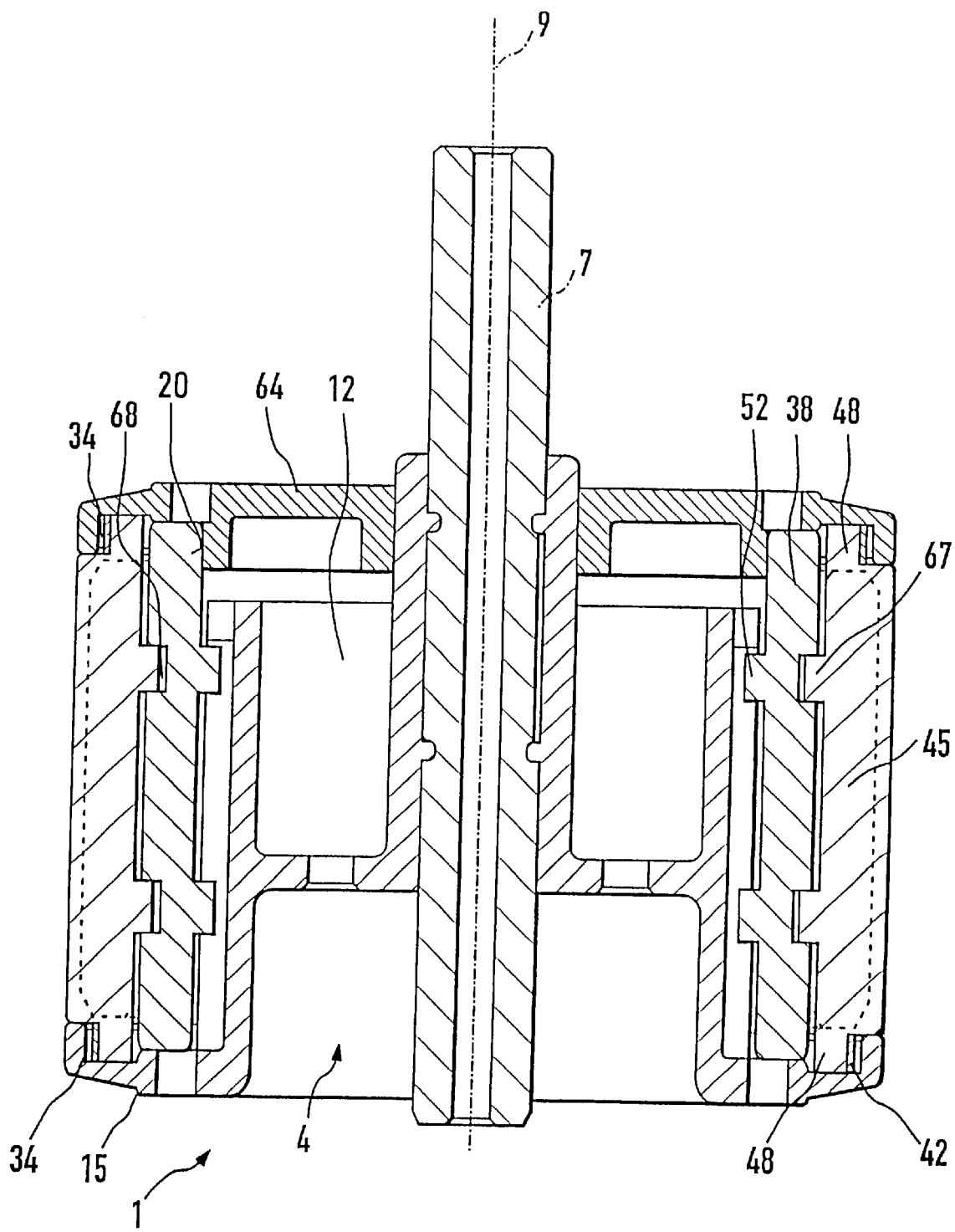
FIG. 7 shows an axial cross section along the line VII—VII in FIG. 5.

FIG. 7 shows a section along the line VII—VII in FIG. 5.

The circumferential grooves 34 of the top part 64 and bottom part 4 respectively encompass the axial tabs 48 of the stays 45 and the rings 42.

For example, the cylindrical part 12 of the bottom part 4 is embodied as a hollow body, with corresponding bores for the rotor shaft 7 and lateral struts to the outer surface 20.

The position of the magnet 40 is indicated with dashed lines in this figure. It is clear that the ring 42 rests not against the magnet 40, for example, but only against the stay 45.

A second exemplary embodiment is shown in FIGS. 8 to 15.

Figure 8:
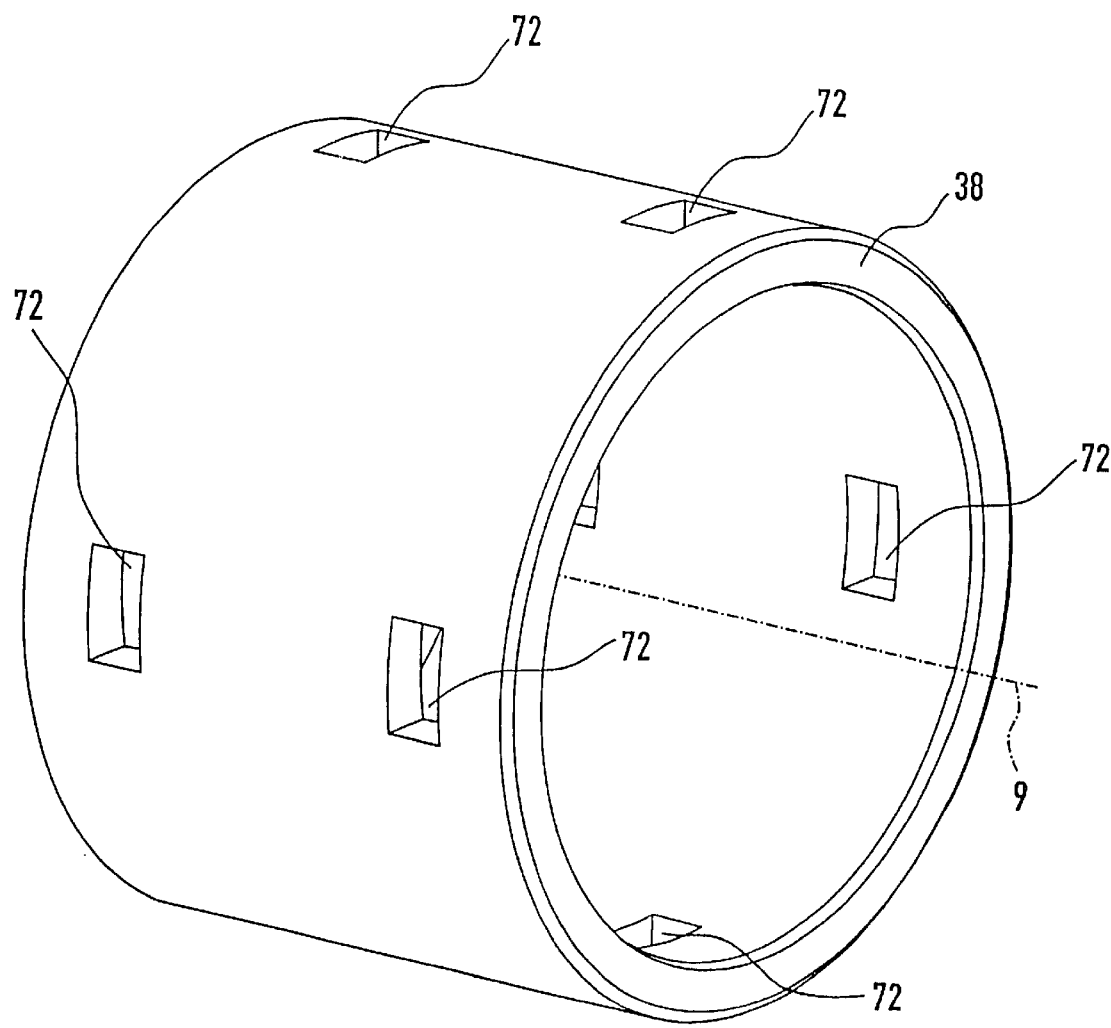
FIG. 8 shows a tubular element of a second exemplary embodiment of a rotor according to the invention.

FIG. 8 shows the tubular element 38, which has at least one opening 72 in its wall. For example four stays 45 (FIG. 10) are placed against the tubular element 38 and have, for example, two securing pieces 82 (FIG. 10) disposed against the stay 45, which securing pieces 82 are inserted through the openings 72. The openings 72 are evenly distributed over the circumference of the tubular element 38. In the axial direction, for example two openings 72 are provided one above the other for the respective stays 45.

Here, too, the tubular element 38 can serve as a magnetic retaining element.

Figure 9:
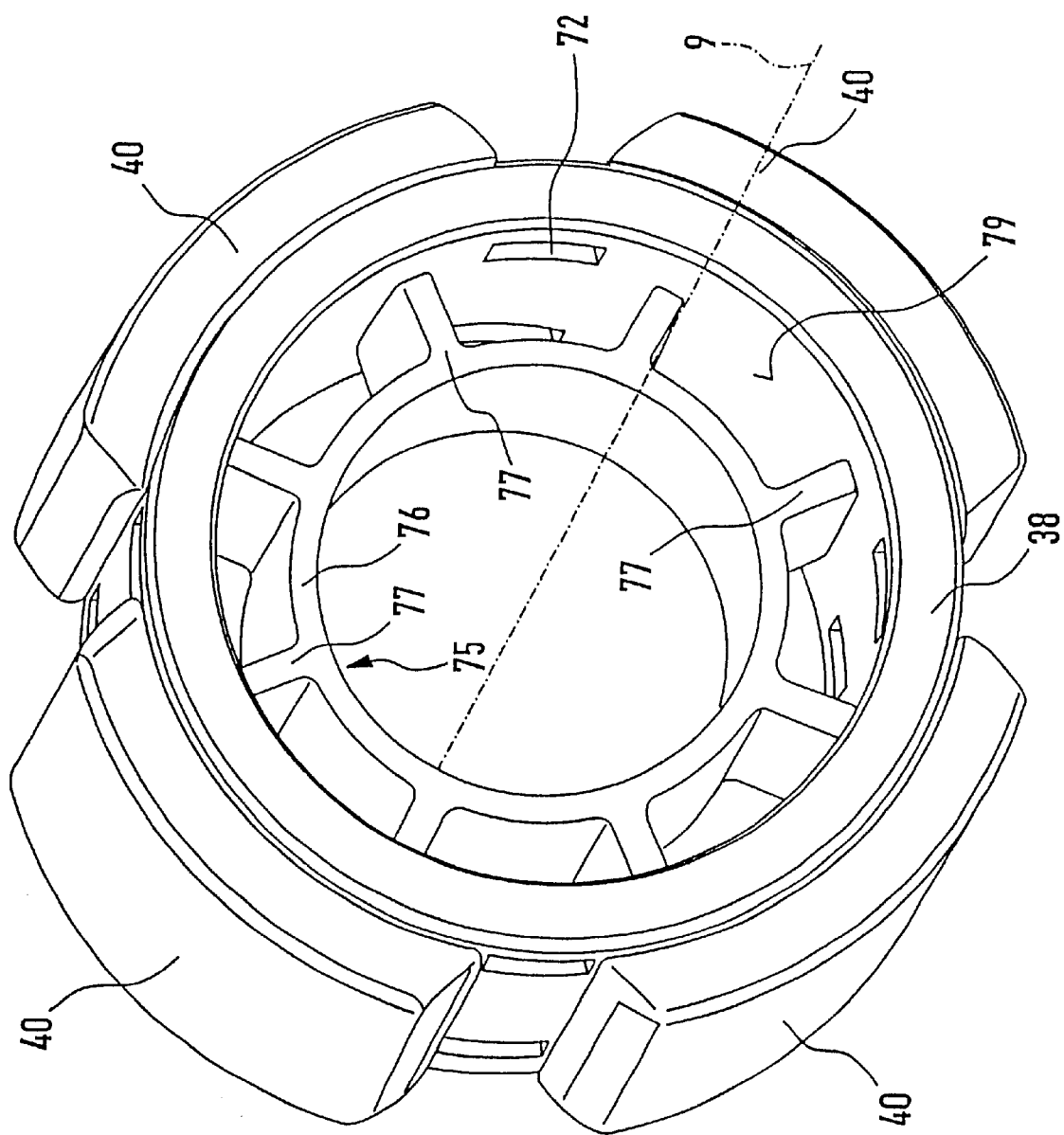
FIG. 9 shows a tubular element with a support bushing and magnets.

By way of example, FIG. 9 shows four magnets 40, which are distributed evenly spaced apart from one another on the tubular element 38. The apparatus is not limited to four magnets 40; there can also be fewer or more magnets 40.

A support bushing 75 is placed or press-fitted into the tubular element 38. The support bushing 75 is comprised, for example, of a support bushing ring 76, which has a smaller diameter than the tubular element 38 and a number of support bushing struts 77 directed radially outward, which rest against an inner surface 79 of the tubular element 38.

Figure 10:
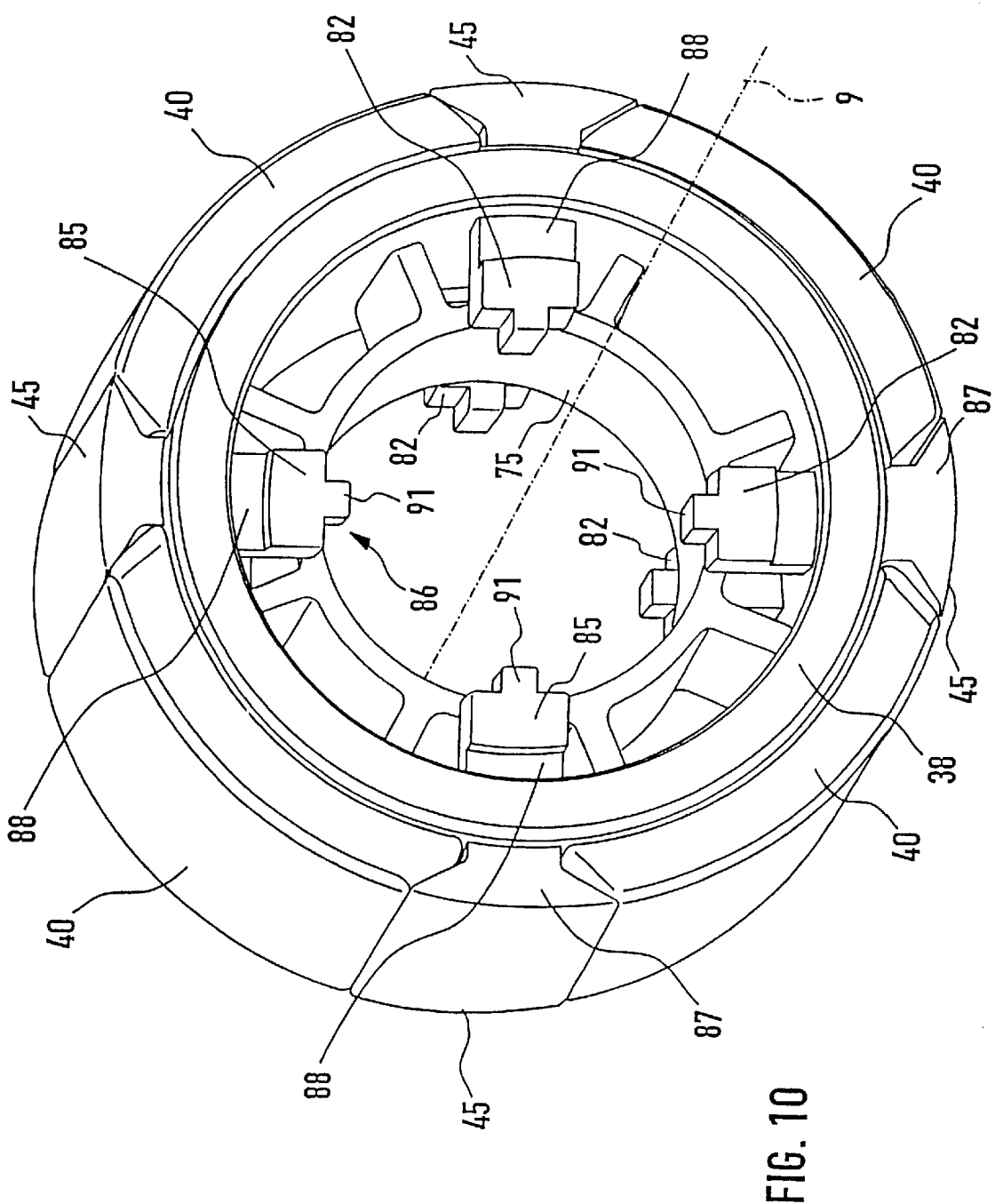
FIG. 10 shows magnets, which are encompassed by stays on a tubular element.

Based on FIG. 9, FIG. 10 shows how the four stays 45 are disposed against the magnets 40 and the tubular element 38.

The stay 45 is embodied similarly to the stay 45 described in FIG. 2, but without tabs 48. The function and mechanism are also similar.

The stay 45 of the second exemplary embodiment also has at least one securing piece 82 extending radially inward, which is guided through the opening 72 of the tubular element 38 and has a free end 86. In this exemplary embodiment, the stay 45 has two securing pieces 82, which are disposed in the vicinity of axial ends 87 of the stay 45.

As a result, the stay 45 is secured axially and can be pressed against the magnets 40 and the tubular element 38 very well at both axial ends 87.

A part of the securing piece 82 is thus disposed inside the tubular element 38. The free end 86 of the securing piece 82 is provided with an axial extension 85, which extends in the axial direction toward an opening of the tubular element 38 and forms a notch 88 with an inner surface 79 of the tubular element 38.

In addition, the free end 86 has a projection 91 extending from it, which is directed radially inward.

Figure 11:
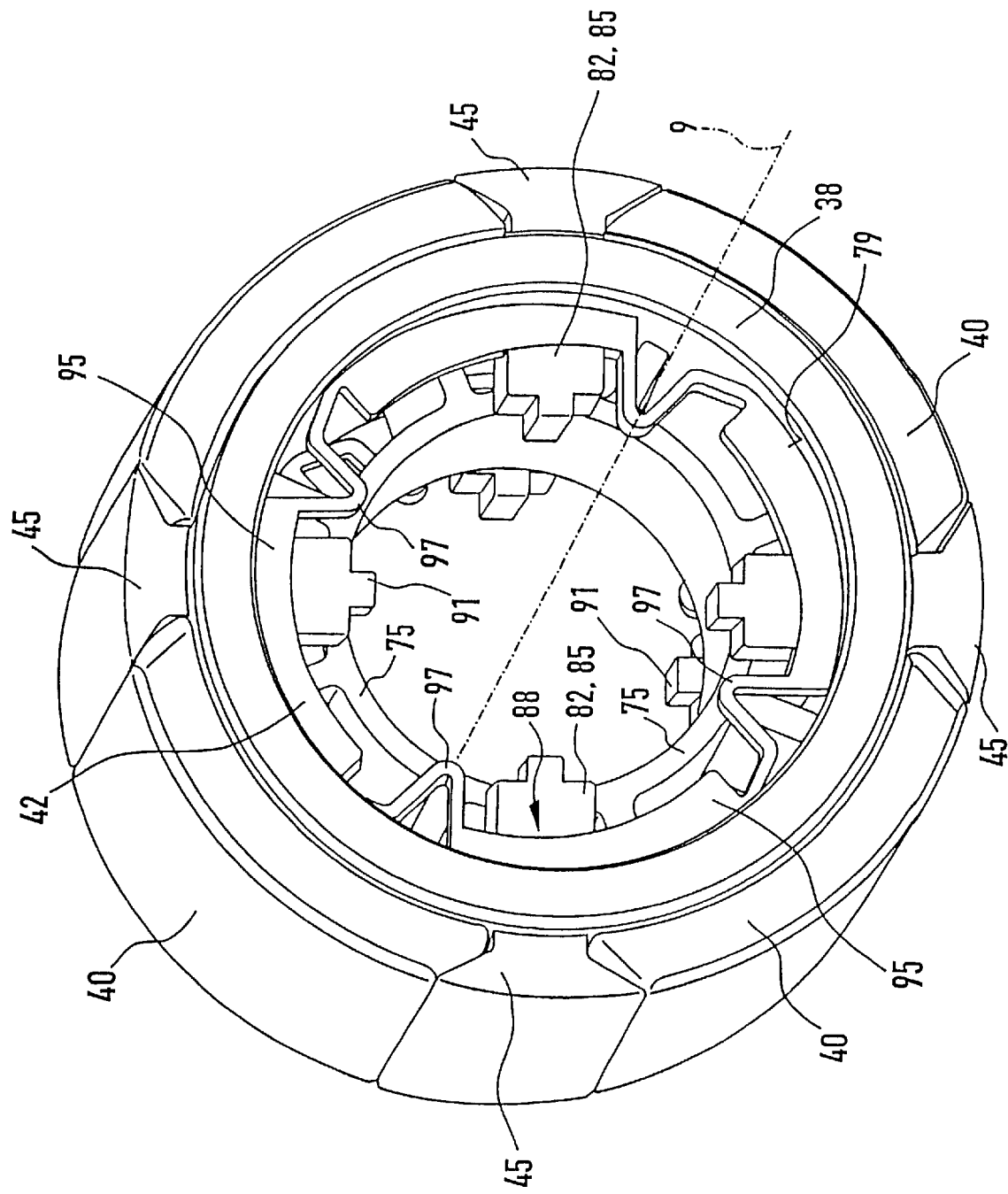
FIG. 11 shows a ring, which fastens the stays to a tubular element.

FIG. 11 shows how the stays 45 are connected in a frictionally engaging manner to the tubular element 38 by means of the ring 42.

The ring 42 is disposed inside the tubular element 38.

The ring 42 is comprised of at least one tensioning part 95 and at least one connecting piece 97, which connects the individual tensioning parts 95 to one another and is thus embodied so that it can be elongated or stretched.

The tensioning part 95 is inserted into the notch 88 and is rotated around the central axis 9 so that the tensioning part 95 is pressed between the inner surface 79 of the tubular element 38 and the axial extension 85 and thus constitutes a bayonet connection with the notch 88. To this end, either the tensioning part 95 or the notch 88, or the tensioning part 95 and the notch 88 are embodied in the form of a wedge. In this instance, the respective tolerances of a stay 45, tubular element 38, and magnets 40 are compensated for individually.

The stay 45 is now also secured radially.

The connecting pieces 97 do not necessarily have to be provided. The tensioning parts 95 can also be installed individually.

For example, the securing piece 82 can rest against the support bushing 75—the support bushing ring 76 in this example—so that the securing piece 82 cannot warp. The length of the support bushing 75 is thus adapted to the axial spacing of the securing pieces 82.

The support bushing 75 also absorbs the bending moments that are exerted by the stays 45 onto the magnets 40 and by the magnets onto the tubular element 38.

Figure 12B:
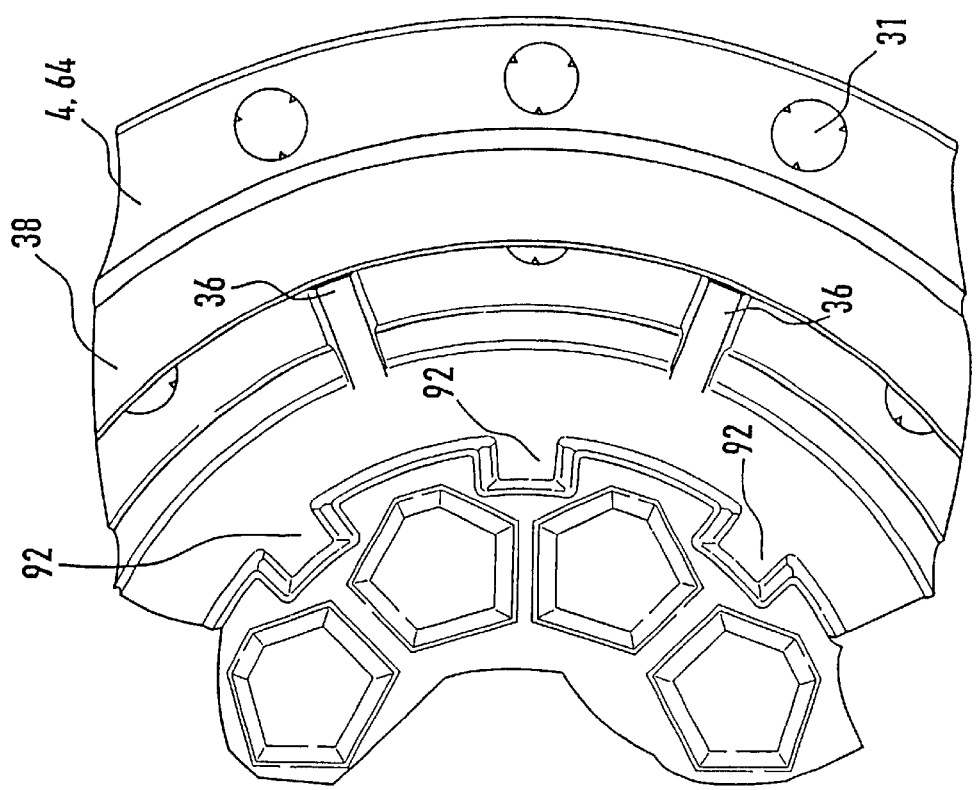
FIG. 12*a* shows a top or bottom part and FIG. 12*b* shows how the ring of FIG. 11 is disposed on a tubular element.
Figure 12A:
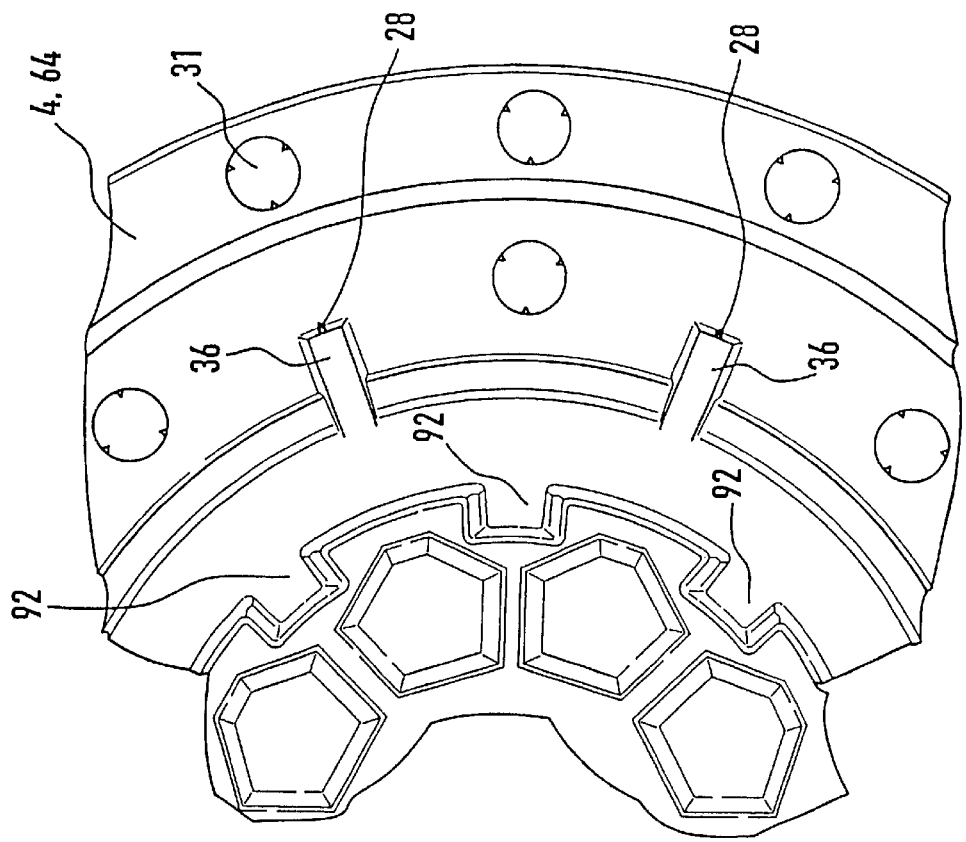

FIG. 12a shows the top part 64 or the bottom part 4, which has at least one spring rib 28 extending in the radial direction on ribs 36, against which the tubular element 38 rests (FIG. 12b), thus permitting a tolerance compensation.

In addition, the top part 64 and the bottom part 4 have at least one projection opening 92, which is disposed inside the tubular element 38.

Figure 13:
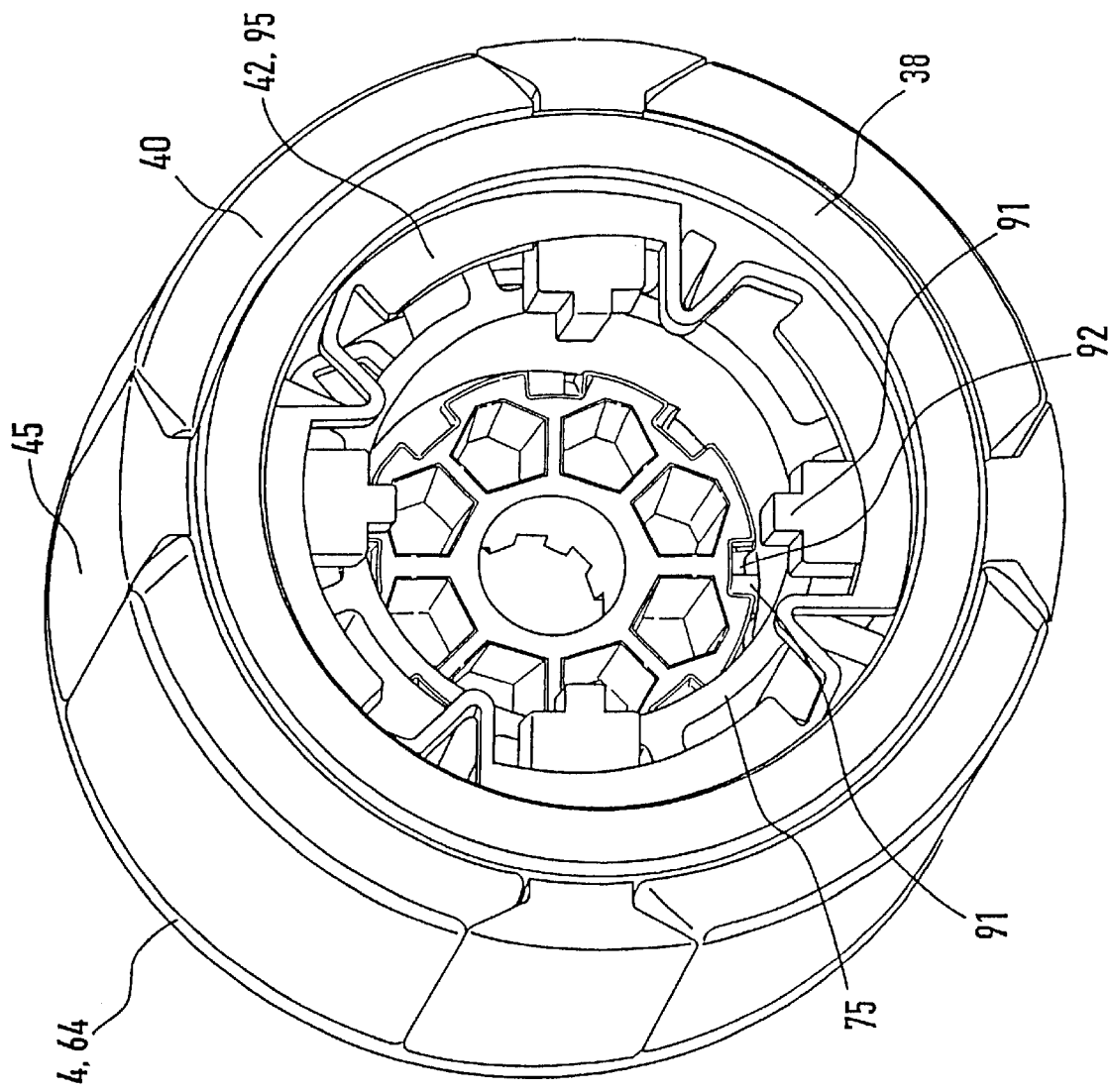
FIG. 13 shows an arrangement according to FIG. 11, with a top or bottom part.

FIG. 13 shows how the bottom part 4 or the top part 64 is mounted onto the apparatus according to FIG. 11. The projection 91 engages in a projection opening 92 of the bottom part 4 or the top part 64 and thus produces a positive engagement with the projection opening 92.

The bottom part 4 or the top part 64 rests against the magnets 40 and thus secures the magnets 40 axially.

FIG. 14a shows the rotor shaft 7 on which a driver 101 is disposed, which with an apparatus according to FIG. 13, is mounted to the top part 64 and bottom part 4, which each have a corresponding opening 102 for the rotor shaft 7.

The driver 101 has at least one driver projection 103, which engages in a corresponding driver recess 105 on the top part 64 or bottom part 4 and forms a positive engagement there. Depending on the number of driver projections 103, for example, the corresponding number of driver recesses 105 is provided.

Figure 14B:
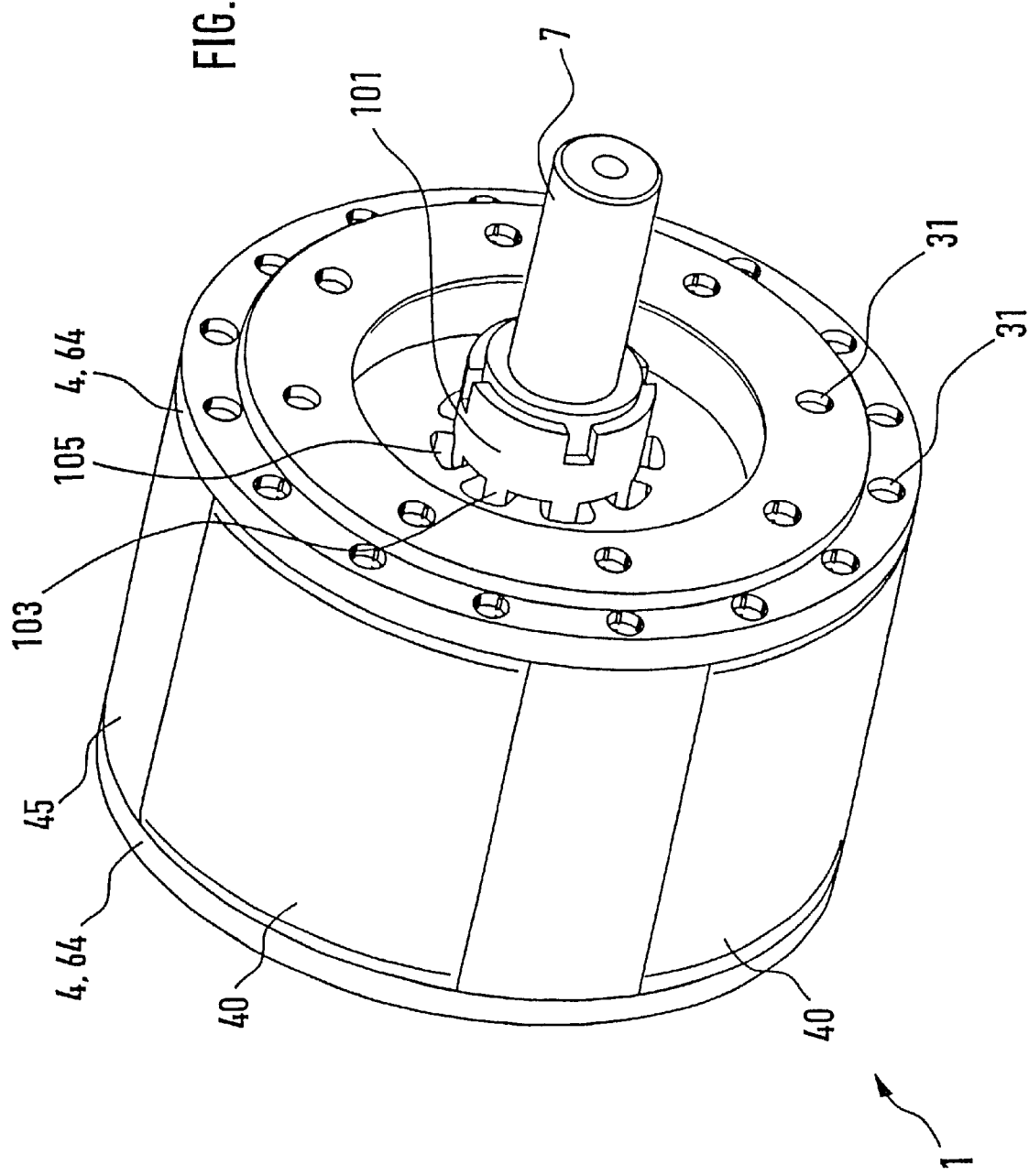
FIG. 14*b* shows the rotor with a mounted rotor shaft.

FIG. 14b shows how the rotor shaft 7 is put together with the rotor 1 and how the driver 101 engages in the bottom part 4 or the top part 64.

Figure 15:
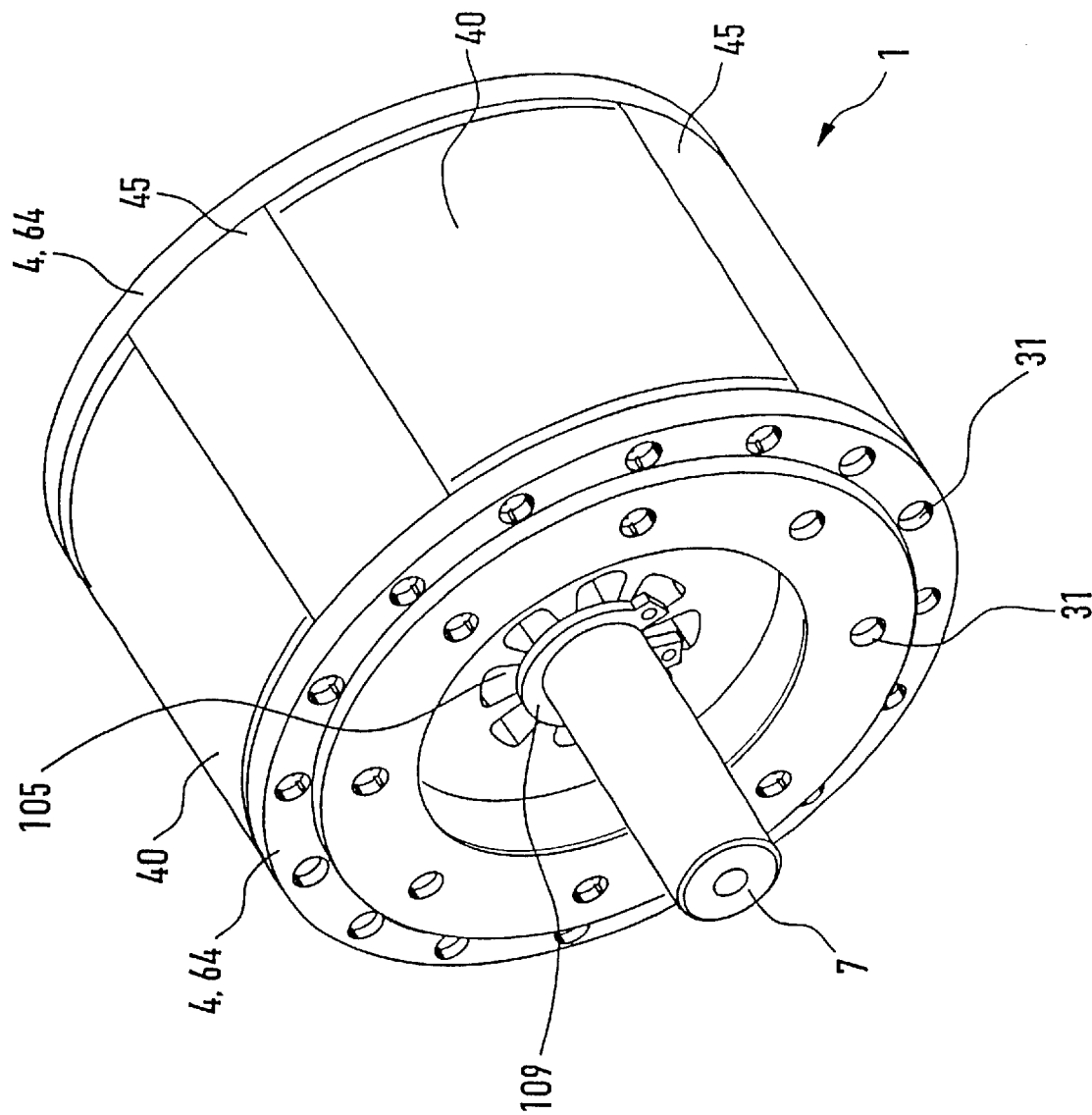
FIG. 15 shows a completely assembled rotor according to the invention, with a rotor shaft.

FIG. 15 shows the other axial end of the rotor 1 from FIG. 14b. At the other axial end of the rotor shaft 7, a snap ring 109 is provided, which engages in a recess of the rotor shaft 7 and secures the top part or bottom part in the axial direction on the rotor shaft 7 so that the driver projection 103 remains in its driver recess 105.

When a torque is exerted on the magnets 40 of the rotor 1 by means of a magnetic field of a stator, the tubular element 38 rotates because the stay 45 connects the magnets 40 to the tubular element 38. The securing piece 82 likewise rotates due to the rotary motion of the tubular element 38. The securing piece 82 is connected to the bottom part 4, for example, with positive engagement by means of the projection 91 and the projection opening 92. The rotor shaft 7 is secured to the bottom part 4 by means of the driver 101 so that the rotor shaft 7 also turns as a result. The foregoing relates to preferred exemplary embodiments of the invention, it being understood that other variants and embodiments thereof are possible within the spirit and scope of the invention, the latter being defined by the appended claims.

What is claimed is:

1. A rotor(1)comprising,
   a top part (64) and a bottom part (4),
   at least one stay (45) and at least one tubular element (38),
   the stay (45) and the tubular element being disposed between the top part (64) and the bottom part (4),and
   at least one magnet (40), disposed between two directly adjacent stays (45), with the stays (45) securing the at least one magnet (40) radially and axially, the stays (45) being secured by means of at least one ring (42).

2. The rotor according to claim 1, wherein that at least two stays (45) form a positive engagement with the at least one magnet (40).

3. The rotor according to claim 1 wherein said stays have at least one axial tab (48), which is engaged by the ring (42).

4. The rotor according to claim 1 wherein the top part (64) is disk-shaped.

5. The rotor according to claim 4 wherein the top part (64) has at least one spring rib (28) extending in the radial direction, which the tubular element (38) rests against.

6. The rotor according to claim 1 wherein the bottom part (4) is cylindrical (12) and has a radial collar (15) at one axial end.

7. The rotor according to claim 6 wherein the cylindrical part (12) of the bottom part (4), on the outer surface (20), has at least one radially protruding, deformable spring rib (28), which is used for tolerance compensation with the tubular element (38).

8. The rotor according to claim 7 wherein the spring rib (28) is disposed on the rib (36).

9. The rotor according to claim 6 wherein the radial collar (15) has bores (31) into which balancing weights can be inserted.

10. The rotor according to claim 6 wherein the radial collar (15) of the bottom part (4) has an at least partially continuous circumferential groove (34) and that when the rotor (1) is assembled, the circumferential groove (34) and the radial collar (15) cover the region of the ring (42) and the axial tabs (48) of the stays (45).

11. The rotor according to claim 1 wherein the bottom part (4) is fastened to a rotor shaft (7).

12. The rotor according to claim 1 wherein the at least one magnet (40) rests against the at least one tubular element (38), and that the tubular element (38) is disposed on the bottom part (4).

13. The rotor according to claim 12 wherein the bottom part (4) has at least one rib (36), which the tubular element (38) rests against.

14. The rotor according to claim 1 wherein the stays (45) engage in recesses on the surface of the tubular element (38) by means of at least one pin (67).

15. The rotor according to claim 14 wherein the rotor (1) has a central axis (9) and the tubular element (38) has at least one radial protrusion (52) pointing radially toward the central axis (9).

16. A rotor according to claim 15 wherein the cylindrical part (12) of the bottom part (4), on an outer surface (20), has at least one groove (24) extending parallel to the central axis (9), into which the radial protrusion (52) of the tubular element (38) can be inserted.

17. The rotor according to claim 1 wherein the bottom part (4) is secured to the top part (64) by means of a detent connection.

18. The rotor according to claim 1 wherein at least one stay (45) is of one piece with the bottom part (4).

19. The rotor according to claim 1 wherein at least one stay (45) is of one piece with the top part (64).

20. The rotor according to claim 1 wherein the tubular element (38) is a retaining element.

21. The rotor according to claim 1 wherein the retaining element is a retaining ring.

22. The rotor according to claim 1 wherein the ring (42) is a spring ring.

23. The rotor according to claim 1 wherein the top part (64) has an at least partially continuous circumferential groove (34) and that when the rotor (1) is assembled, the circumferential groove (34) and the top part (64) cover the region of the ring (42) and the axial tabs (48) of the stays (45).

24. The rotor according to claim 1 wherein at least one tab (48) of the stay (45) has at least one projection (49), which secures the magnet (40) axially.

25. The rotor according to claim 1 wherein the bottom part (4) is disk-shaped.

26. The rotor according to claim 25 wherein the bottom part (4) has at least one spring rib (28) extending in the radial direction, which the tubular element (38) rests against.

27. The rotor according to claim 1 further comprising a rotor shaft (7) having a driver (101) attached to it, which produces a positive engagement with the bottom part (4) or the top part (64) so that the bottom part (4) and the top part (64) rotate when the rotor shaft (7) rotates.

28. The rotor according to claim 1 further comprising a support bushing (75) disposed in the tubular element (38).

29. The rotor according to claim 1 wherein the at least one tubular element (38) has at least one opening (72) and that the stay (45) has at least one securing piece (82) that extends radially inward through the opening (72).

30. The rotor according to claim 29 wherein the securing piece (82) has an axial extension (85), which forms a notch (88) on the inside of the tubular element (38) together with an inner surface (79) of the tubular element (38), and that the securing piece (82) forms a bayonet connection with the tubular element (38) and a tensioning part (95).

31. The rotor according to claim 29 wherein the securing piece (82) has an axial extension (85), which forms a notch (88) on the inside of the tubular element (38) together with an inner surface (79) of the tubular element (38), and the ring (42) is disposed inside this notch (88).

32. The rotor according to claim 31 wherein the ring (42) is comprised of at least one tensioning part (95) and at least one connecting piece (97) and that the tensioning part (95) forms a bayonet connection with the notch (88).

33. The rotor according to claim 29 wherein the securing piece (82) has at least one projection (91), that the top part (64) and bottom part (4) have at least one projection opening (92), and that the projection (91) forms a positive engagement with the projection opening (92).

34. The rotor according to claim 29 wherein the tubular element (38) has a support bushing (75) and that the securing piece (82) rests against the support bushing (75).

35. The rotor according to claim 1 wherein the top part (64) or the bottom part (4) has bores (31) into which balancing weights can be inserted.

* * * * *